US008741255B2

(12) United States Patent
Jaensch et al.

(10) Patent No.: US 8,741,255 B2
(45) Date of Patent: Jun. 3, 2014

(54) OXIDATION PROCESS

(75) Inventors: Helge Jaensch, Houston, TX (US);
Gary David Mohr, Houston, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 1392 days.

(21) Appl. No.: 11/829,346

(22) Filed: Jul. 27, 2007

(65) Prior Publication Data

US 2009/0030214 A1 Jan. 29, 2009

(51) Int. Cl.
| *C07D 307/78* | (2006.01) |
| *C07C 33/00* | (2006.01) |
| *C07C 51/00* | (2006.01) |
| *C07F 13/00* | (2006.01) |
| *C07F 7/28* | (2006.01) |
| *C07F 9/00* | (2006.01) |
| *C07F 15/00* | (2006.01) |
| *C07C 69/96* | (2006.01) |
| *C07D 301/00* | (2006.01) |

(52) U.S. Cl.
USPC ........ 423/415.2; 423/421; 423/430; 549/466; 549/518; 556/1; 556/146; 556/42; 556/45; 556/51; 568/716; 568/300; 568/700; 558/263; 562/550

(58) Field of Classification Search
USPC ............... 423/415.2, 421, 430; 549/466, 518; 556/1, 146, 42, 45, 51, 57; 558/263; 568/300, 700, 716
See application file for complete search history.

(56) References Cited

U.S. PATENT DOCUMENTS

| 2,043,102 | A | * | 6/1936 | Kester ........................ 568/749 |
| 3,592,941 | A | * | 7/1971 | Shultz et al. ................. 429/418 |
| 3,876,527 | A | * | 4/1975 | Dugan et al. ................. 208/125 |
| 4,785,123 | A | * | 11/1988 | Pennington .................. 549/532 |
| 4,882,443 | A | | 11/1989 | Pennington |
| 4,883,889 | A | | 11/1989 | Pennington |
| 4,885,374 | A | | 12/1989 | Pennington |
| 4,943,643 | A | | 7/1990 | Pennington et al. |
| 4,959,486 | A | | 9/1990 | Pennington |
| 4,992,567 | A | * | 2/1991 | Meyer et al. ................. 549/532 |
| 5,506,363 | A | * | 4/1996 | Grate et al. .................. 568/401 |

FOREIGN PATENT DOCUMENTS

| DE | 1767796 | 9/1971 |
| EP | 0 268870 | 4/1991 |
| GB | 549298 | 11/1942 |
| JP | 58-199704 | 11/1983 |
| WO | WO 92/09588 | 6/1992 |

OTHER PUBLICATIONS

D. Moyaux et al., "Dependence of the concentration of 0(-I) on the partial pressures of oxygen and carbon dioxide in a molten $Li_2CO_3+Na_2CO_3+K_2CO_3$ eutectic mixture at 973 K," J. Electroanal. Chem., vol. 349, 1993, pp. 415-428.

Li-Jiang Chen, et al. *First Spectroscopic Observatin of Peroxocarbonate/Peroxodicarbonate in Molten Carbonate*, J. Phys. Chem. B (2004), 108, pp. 7553-7556.

T.A. Nijhuis, S. Musch, M. Makkee, J.A. Moulijn, *The Direct Epoxidation of Propene by Molten Salts*, Applied Catalysis A: General 196 (2000), pp. 217-224.

* cited by examiner

*Primary Examiner* — Daniel C McCracken

(57) ABSTRACT

Peroxo-carbonates derived from molten alkali and/or Group II metal salts, particularly carbonate salts are used as catalysts in oxidation and epoxidation reactions. Transition metal compounds may be included to improve the selectivity of the reactions.

16 Claims, No Drawings

OXIDATION PROCESS

FIELD OF THE INVENTION

The present invention relates to oxidation and in particular the oxidation of saturated and unsaturated hydrocarbons using a molten alkali metal and/or Group II metal carbonate.

BACKGROUND

The present invention is concerned with oxidation and in particular the oxidation of saturated and unsaturated hydrocarbons using molten alkali metal and/or Group II metal carbonate. The invention may be used to oxidize alkanes to produce oxygen containing organic compounds such as alcohols, and carbonyl containing compounds such as aldehydes and ketones and carboxylic acids. In addition it may be used to oxidize alkenes to produce epoxides or aromatic substrates to their corresponding oxygenated species. In particular the invention is concerned with the oxidation of $C_1$ to $C_4$ alkanes and more particularly methane, ethane, propane and butane, preferably derived from natural gas.

The availability of large quantities of natural gas has led to numerous proposals to upgrade the gas to more valuable chemicals including oxygen-containing organic compounds. The only commercial processes so far developed have required the sequential steps of catalytic dehydrogenation of the alkane to form an olefin followed by oxidation of the reactive olefinic site to produce the oxygenate. Other processes have been proposed for the direct oxidation of alkanes to oxygenates. However, these processes have low conversion and low selectivity and usually require high temperatures.

The two stage vapour phase oxidation of propylene to produce acrylic acid is known. However, there is no known commercial process based on propane oxidation to acrylic acid. The production of acrylic acid from propane would be more attractive because of the significant price difference between propane and propylene.

It is known that molten metal salts can be used as oxidation catalysts. For example U.S. Pat. No. 4,785,123 proposes the use of molten nitrates for the oxidation of alkylenes and alkanes. The oxidation of propylene and isobutene using a mixture of molten potassium nitrate and molten sodium nitrate is exemplified although the yields of the oxidation products are low. Similar reactions are disclosed in U.S. Pat. Nos. 4,882,443; 4,883,889; 4,885,374; 4,943,643; 4,959,486; 4,992,567. Various co-catalysts are also proposed in European Patent Publication EP 0 268 870 and PCT Publication WO 92/09588 and these are said to improve conversion and selectivity.

A possible reaction mechanism for these premises is provided in Applied Catalysis A general 196(2000) 217224 entitled "The direct epoxidation of propene by metal salts" by T A Nijhuis, S Musch, M Mackhee and K A Monlijn.

Molten metal carbonates are also known for use in fuel cells and are described in a paper in the J Phys Chem B 2004 108 pages 7553 to 7556 by Chen et al. The paper is particularly concerned with determining the nature of the active oxygen species.

The present inventors recognize that that molten carbonate salts may be used as oxidation catalysts through the in situ generation of peroxo-carbonate species.

SUMMARY OF THE INVENTION

This invention relates to a process to produce peroxo-carbonates comprising reacting a molten alkali and/or Group II metal carbonate with oxygen and a process to produce oxygenates comprising reacting said peroxo-carbonates with a saturated or unsaturated hydrocarbon and oxygen.

DETAILED DESCRIPTION

The present invention provides the reaction of a molten alkali and/or Group II metal carbonate with oxygen to produce a peroxo-carbonate. The present invention also provides a process to produce peroxo-carbonates comprising reacting a molten alkali and/or Group II metal carbonate with oxygen.

When the metal is an alkali metal this reaction proceeds according to the following reaction scheme.

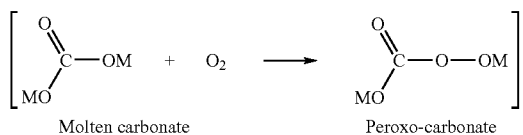

Molten carbonate → Peroxo-carbonate where M is the Group II or alkali metal. Useful alkali metals include lithium, sodium, potassium, rubidium, cesium, and francium. Useful Group II metals include beryllium, magnesium, calcium, strontium, barium, and radium.

The invention further provides the reaction of the peroxo-carbonate of an alkali and/or Group II metal with hydrocarbons to produce oxygenates. The present invention also provides a process to produce oxygenates comprising reacting a peroxo-carbonates with a saturated or unsaturated hydrocarbon and oxygen.

This reaction when employing the alkali metal peroxo-carbonate to oxidize a hydrocarbon (as is exemplified by the use of a butyl ($C_4$) hydrocarbon) proceeds as follows:

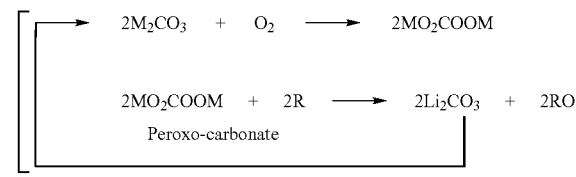

where M is the alkali or Group II metal, and R is saturated or unsaturated hydrocarbon, such as a butyl ($C_4$) hydrocarbon.

Accordingly the reaction cycle results in the recreation of the alkali and/or Group II metal carbonate once it has been used to oxidize the hydrocarbon.

When an alkali metal carbonate is used in the present invention the alkali metal may be any suitable alkali metal such as lithium, sodium or potassium, though mixtures of alkali metal carbonates are preferred. Lithium is particularly preferred. Where a Group II metal carbonate is used the Group II metal may be any suitable Group II metal, with magnesium, calcium, strontium and barium being preferred. Mixtures of the carbonates of these metals may be used as may mixtures of alkali metal and Group II metal carbonates. The formation of the peroxo-carbonate is achieved by melting the carbonate and then reacting the molten carbonate with molecular oxygen which may be pure oxygen or air, although air is preferred.

The oxidation process of the invention involves contacting the hydrocarbon with the peroxo-carbonate under oxidation conditions and the conditions that should be used will depend upon the nature of the hydrocarbon and the nature of the peroxo-carbonate that is used. The reaction may be performed in the gas phase or the liquid phase which may be solution or slurry. Gas phase is however preferred. Whatever the phase that is employed, the use of the metal complexes according to this invention provides a degree of flexibility to enhance the production of the desired oxygen containing materials. Although the preferred oxidation conditions are specific to the hydrocarbon to be oxidized and the oxygen containing product to be produced it is preferable to perform the reaction at elevated pressures. The oxidation is typically performed with molecular oxygen generally provided as air and at a temperature in the range 150° C. to 450° C. more typically 200° C. to 400° C. preferably 200° C. to 350° C. more preferably 250° C. to 350° C.

In one embodiment the oxidation reaction of the present invention may be performed in a continuous manner in a circular (or continuous reactor) wherein the molten alkali or group II metal or and/metal carbonate is introduced into the reactor and passes up one side of the reactor where it is brought into contact with an oxygen containing gas such as air and is converted into the peroxo-carbonate. The peroxo-carbonate then continues around the continuous reactor where it is brought into contact with the substrate to be oxidized (such as a hydrocarbon—for example an alkane such as propane from natural gas). The substrate is then oxidized and the oxidized product removed from the reactor and the peroxo-carbonate oxidizing agent reverts to the carbonate for another cycle around the reactor.

The peroxo-carbonates of the present invention may be used for the oxidation of any hydrocarbon materials. However they are particularly useful in the oxidation of alkanes and alkenes and in particular the oxidation of $C_1$ to $C_6$ alkanes and alkenes, particularly propane, propylene, butane, butene, pentane, pentene, octane, octene, and the like. The invention is particularly useful in the oxidation naturally occurring gaseous alkanes such as ethane, propane and butane.

Where propane is the raw material, the source of the propane can be a gas stream which contains at least three volume percent of propane or a mixture of propylene and propane. The gas stream can also contain some amounts of the $C_2$ or $C_4$ alkanes, preferably less than thirty volume percent of each. The gas stream can also contain major amounts, more than five volume percent of diluents such as nitrogen, argon, or carbon dioxide. It is preferred the gas stream contain little to no water, preferably less than 50 ppm of water, preferably less than 10 ppm of water, more preferably less than 1 ppm water.

In carrying out the process with propane as the raw material 0.01 to 2.0 moles of molecular oxygen are typically provided per mole of propane. The oxygen may be provided either as pure oxygen or in the form of air.

Molecular oxygen sources include purified oxygen, air and oxygen-enriched air, depending on the economics of separation and the hydrocarbon conversion achieved. The ratio of alkane/alkene to the oxygen provided by the peroxo-carbonate varies with the desired conversion and the selectivity of the catalyst, but it is generally in the range of 1:5 to 5:1.

The oxygen concentration in the feed gas mixture can vary widely, from 0.1 to 50% or higher of the feed mixture. At higher levels it may be necessary to apply measures to avoid explosion problems. Air is the preferred source of oxygen in the feed. The amount of oxygen present may be a stoichiometric amount, or lower, in relation to the hydrocarbons in the feed.

The reaction can also be affected in the presence of diluents such as argon, nitrogen or carbon dioxide. When the substrate is propane the ratio of propane to diluents can be in the range of 1:5 to 1:1.

Gasses such as helium, nitrogen and carbon dioxide may be used as reaction diluents or heat moderators.

The reaction zone for the oxidations according to the present invention preferably has a pressure of from 1 to 50 bar (100 kPa to 5000 kPa) preferably from 1 to 30 bar (100 kPa to 3000 kPa), a temperature of from about 150° C. to about 450° C., preferably from 150° C. to 300° C. more preferably 150° C. to 250° C.; a contact time between the substrate to be oxidized and the peroxo-carbonate catalyst of from about 0.01 second to 100 seconds, preferably from 0.1 second to 10 seconds. In a continuous reaction it is preferred that the substrate to be oxidized has a space hourly velocity of from about 50 to about 50,000 $h^{-1}$, preferably from 100 to 10,000 $h^{-1}$ and most preferably from 200 to 3,000 $h^{-1}$.

The contact time is defined as the ratio between the apparent volume of the catalyst and the volume of the gaseous reaction mixture feed passing through the catalyst bed under the given reaction conditions per a unit of time.

The space velocity is calculated by determining the total reactor outlet gas equivalent in liters of the total effluent evolved over a period of one hour divided by the liters of catalyst in the reactor. This room temperature volume is converted to the volume at 0° C. at 1 bar (100 kPa).

The reaction pressure may be initially provided by the feed of the gaseous reactant and diluent and after the reaction has commenced, may be maintained by the use of a suitable back pressure controller placed on the reactor outlet stream.

The process may be carried out in a single stage with hydrocarbon being supplied as a single feed with non-reacted initial reactants being recycled. However multiple stage addition of oxygen or hydrocarbon to the reactor can be used and/or recycling of un-reacted gases with purge mode can be applied to improve the overall productivity and/or yield of the desired products.

The liquid products of the reaction can be separated from the unreacted feed hydrocarbons by condensation or scrubbing, usually by water or dilute acid.

The metal complexes (peroxo-carbonates) described herein may be used for oxidizing $C_1$-$C_5$ alkanes, preferably $C_2$-$C_4$ alkanes such as ethane, propane and butane, to produce corresponding oxygenated products such as acetic, acrylic and methacrylic acids, and, for oxidizing n/iso $C_4$ and $C_5$ alkanes in the vapour phase with molecular oxygen to produce the corresponding alpha-beta unsaturated carboxylic acids. The invention is particularly useful for the oxidation of propane to acrylic acid and acrolein.

Likewise the metal complexes described herein may be used for oxidizing aromatics to phenols, oxidizing xylenes to the corresponding acids and or diacids, oxidizing ortho-xylene to phthaic anhydride, and oxidizing olefins (such as $C_2$ to $C_8$ olefins, preferably ethylene, propylene, butene, pentene, hexene, octene) to epoxides and or dialcohols.

In one embodiment of the invention additional metal cations are provided together with the peroxo-carbonate in order to improve the selectivity of a particular desired reaction. The preferred metal cation or mixture of cations will depend upon the use to which the compound is to be put. When it is to be used for alkane oxidation it will depend upon the alkane to be oxidized and the product that is to be produced. However, any metal cations that are redox active, such as transition metal cations, may be used.

Transition metal cations are preferred metal cations to be used with the peroxo-carbonate, titanium, manganese, cobalt, vanadium, iron and nickel being preferred. The present invention therefore further provides an alkali metal and/or Group II metal peroxo-carbonate containing transition metal cations and the use of such an alkali metal and/or Group II metal peroxo-carbonate containing a transition metal cation as an oxidation catalyst. The presence of the transition metal cation is thought to improved the selectivity of the oxidation reaction in that the transition metal will coordinate with the peroxo component of the peroxo-carbonate and enhance the selectivity of the oxidation reaction The transition metal will therefore be chosen according to the substrate to be oxidized and the oxidation product required.

The transition metal may be introduced into the peroxo-carbonate simply by introducing a salt of the transition metal into the molten alkali metal and/or Group II metal carbonate. The salt will then decomposed at the temperature involved to provide the transition metal cation within the molten alkali metal and/or Group II metal carbonate which may then be converted to the peroxo-carbonate which will contain the transition metal cation. Oxides or halides of the transition metals are particularly useful salts, oxides are preferred to avoid the presence of halides in the reactor and reaction products.

Other metals may be introduced into the catalyst slurry in the form of salts of oxides, acetates, chlorides, nitrates or the like.

When niobium is used as the or one of the metals, it is preferably used in the form of oxalates or hydrate oxides. Other sources of this metal in soluble form include compounds in which the metal is coordinated, bonded or complexed to a beta-diketone, carboxylic acid, an amine, an alcohol or an alkanolamine.

According to one preferred embodiment the peroxo-carbonate catalyst of the present invention contains a metal component which is a mixed metal oxide component which may contain transition metals such as vanadium and molybdenum. In this situation, the compounds may be prepared by the following general procedure. Aqueous solutions of vanadium and molybdenum are prepared separately, then the vanadium solution is mixed with the molybdenum solution at a specified temperature and pH. The remaining required components are slowly added to the combined solutions. After mixing, the resultant gel is dried to incipient wetness with continuous stirring and then added to the molten alkali metal and/or Group II metal carbonate.

In another embodiment this invention relates to:
1. The reaction of a molten alkali metal and/or Group II metal carbonate with oxygen to produce a peroxo-carbonate.
2. The reaction according to paragraph 1 wherein the alkali metal carbonate is one or more of lithium, sodium and potassium carbonate.
3. An alkali metal and/or Group II metal peroxo-carbonate containing transition metal cations.
4. An alkali metal and/or Group II metal peroxo-carbonate according to paragraph 3 wherein the transition metal is selected from a titanium, manganese, cobalt, vanadium, iron and nickel.
5. A peroxo-carbonate of an alkali metal and/or a Group II metal which contains a metal component which is a mixed metal oxide component.
6. A peroxo-carbonate according to paragraph 5 wherein the mixed metal oxide contains transition metals.
7. A peroxo-carbonate according to paragraph 6 wherein the transition metals include vanadium and molybdenum.
8. A peroxo-carbonate or reaction according to any of the preceding paragraphs 1 to 7 employing a mixture of the alkali metal and Group II metal.
9. The reaction of the peroxo-carbonate of an alkali metal and/or Group II metal with hydrocarbons and oxygen to produce oxygenates.
10. The reaction according to paragraph 9 wherein an alkali metal is used and the alkali metal is selected from one or more of lithium, sodium and potassium.
11. The reaction according to paragraph 9 wherein a Group II metal carbonate is used and the Group II metal is selected from magnesium, calcium, strontium and barium.
12. The reaction according to paragraphs 9 to 11 in which the reaction is in the gas phase.
13. The reaction according to any of paragraphs 9 to 11 in which the reaction is performed in the liquid phase which may be solution or slurry.
14. A reaction according to any of paragraphs 9 to 12 in which the oxidation is performed with molecular oxygen.
15. A reaction according to paragraph 14 in which the molecular oxygen is provided as air.
16. A reaction according to any of paragraphs 9 to 15 performed at a temperature in the range 150° C. to 450° C.
17. A reaction according to any of paragraphs 9 to 16 which is performed in a continuous manner.
18. A reaction according to paragraph 17 performed in a continuous reactor wherein the molten alkali metal and/or Group II metal carbonate is introduced into the reactor and passes up one side of the reactor where it is brought into contact with an oxygen containing gas and is converted into the peroxo-carbonate wherein the peroxo-carbonate then continues around the continuous reactor where it is brought into contact with the substrate to be oxidized wherein the substrate is oxidized and the oxidized product is removed from the reactor and the peroxo-carbonate oxidising agent reverts to the carbonate for use in another cycle around the reactor.
19. A reaction according to any of paragraphs 9 to 18 wherein the hydrocarbon is a $C_1$ to $C_6$ alkane or alkene.
20. A reaction according to paragraph 19 wherein the hydrocarbon is selected from one or more of ethane, propane and butane.
21. A reaction according to paragraph 20 in which the hydrocarbon is propane and 0.01 to 2.0 moles of molecular oxygen are provided per mole of propane.
22. A reaction according to any of paragraphs 9 to 21 performed in the presence of diluents such as argon or nitrogen.
23. A reaction according to paragraph 22 wherein the substrate is propane and the ratio of propane diluent is in the range of 1:5 to 1:1.
24. A reaction according to any of paragraphs 9 to 23 in which the reaction zone for the oxidation has a pressure of from 1 to 50 bar, a temperature of from 150° C. to 450° C., and the contact time between the substrate to be oxidized and the peroxo-carbonate catalyst is from 0.01 second to 100 seconds.
25. A process comprising introducing a salt of the transition metal into a molten alkali metal and/or Group II metal carbonate.
26. A process according to paragraph 25 wherein the salt of the transition metal is an oxide, a nitrate, a halide or a carbonate.

All documents described herein are incorporated by reference herein, including any priority documents and/or testing procedures to the extent they are not inconsistent with this text. As is apparent from the foregoing general description and the specific embodiments, while forms of the invention have been illustrated and described, various modifications can be made without departing from the spirit and scope of the invention. Accordingly, it is not intended that the invention be limited thereby.

The invention claimed is:

1. A process to produce a peroxo-carbonate of a molten Group II metal carbonate and thereafter oxidize hydrocarbons comprising reacting a molten Group II metal carbonate with oxygen to produce a peroxo-carbonate of the Group II metal carbonate, and thereafter the peroxo-carbonate is then brought into contact with hydrocarbons where the hydrocarbons are oxidized and the peroxo-carbonate oxidizing agent reverts to a Group II metal carbonate.

2. The process of claim 1 wherein the metal of the Group II metal carbonate is selected from the group consisting of calcium, strontium and barium.

3. The process of claim 1 wherein the Group II metal carbonate is melted and then reacted with air.

4. The process of claim 1 performed in a continuous reactor wherein the molten Group II metal carbonate is introduced into the reactor and is brought into contact with an oxygen containing gas and is converted into the peroxo-carbonate.

5. The process of claim 1 wherein a transition metal salt is introduced into the molten carbonate.

6. The process of claim 5 wherein the salt is an oxide or a halide of the transition metal.

7. The process of claim 5 wherein the transition metal is selected from titanium, manganese, cobalt, vanadium, iron and nickel.

8. The process of claim 5 wherein the transition metals include vanadium and molybdenum.

9. The process of claim 1 performed in a continuous reactor wherein the molten Group II metal carbonate is introduced into the reactor where it is brought into contact with an oxygen containing gas and is converted into the peroxo-carbonate, and wherein thereafter the peroxo-carbonate is then brought into contact with hydrocarbons wherein the hydrocarbons are oxidized and the oxidized product is removed from the reactor and the peroxo-carbonate oxidizing agent reverts to the carbonate for use in another cycle in the reactor, wherein the hydrocarbons are $C_1$ to $C_6$ alkanes and/or $C_1$ to $C_6$ alkenes.

10. The process of claim 1 wherein the peroxo-carbonate is reacted with $C_1$ to $C_6$ alkanes and/or $C_1$ to $C_6$ alkenes to produce oxygenates, where the ratio of alkane/alkene to oxygen provided by the peroxo-carbonate is in the range of 1:5 to 5:1.

11. The process of claim 1 wherein a transition metal salt is introduced into the molten carbonate and the peroxo-carbonate contains transition metal cations, wherein the transition metal is titanium, manganese, cobalt, vanadium, iron or nickel.

12. The process of claim 9 wherein the hydrocarbons to be oxidized have a space hourly velocity of from about 50 to about 50,000 $h^{-1}$.

13. The process of claim 9 in which the reaction where the peroxo-carbonate is brought into contact with hydrocarbons is performed in the gas phase.

14. The process according to claim 9 in which the reaction where the peroxo-carbonate is brought into contact with hydrocarbons is performed in the liquid phase which may be solution or slurry.

15. The process according to claim 9 wherein the hydrocarbon is selected from one or more of ethane, propane and butane.

16. A process according to claim 9 in which the reaction zone for the reaction to produce oxygenates has a pressure of from 1 to 50 bar, a temperature of from 150° C. to 450° C., and the contact time between the hydrocarbons to be oxidized and the peroxo-carbonate catalyst is from 0.01 second to 100 seconds.

* * * * *